US009691407B2

(12) United States Patent
Oda et al.

(10) Patent No.: US 9,691,407 B2
(45) Date of Patent: Jun. 27, 2017

(54) NOISE REDUCTION APPARATUS, NOISE REDUCTION METHOD, AND NOISE REDUCTION PROGRAM

(71) Applicant: JVC KENWOOD Corporation, Yokohama-shi, Kanagawa (JP)

(72) Inventors: Keisuke Oda, Yokohama (JP); Takaaki Yamabe, Yokosuka (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 8 days.

(21) Appl. No.: 14/461,311

(22) Filed: Aug. 15, 2014

(65) Prior Publication Data

US 2015/0262576 A1 Sep. 17, 2015

(30) Foreign Application Priority Data

Mar. 17, 2014 (JP) ................................ 2014-053857

(51) Int. Cl.
*G10L 15/00* (2013.01)
*G10L 21/00* (2013.01)
(Continued)

(52) U.S. Cl.
CPC ...... *G10L 21/0216* (2013.01); *G10L 21/0224* (2013.01); *G10L 21/0264* (2013.01)

(58) Field of Classification Search
CPC .. G10L 21/0208; H04N 11/00; G10K11/1788; G11B 5/6005; G11B 5/59627
See application file for complete search history.

(56) References Cited

U.S. PATENT DOCUMENTS 5,903,819 A 5/1999 Romesburg
6,140,568 A * 10/2000 Kohler ................ G10H 1/0066 84/616

(Continued)

FOREIGN PATENT DOCUMENTS

JP 2000-507054 A 6/2000
JP 2002251823 A 9/2002

(Continued)

OTHER PUBLICATIONS

S. Lawrence Marple, "Estimating Group Delay and Phase Delay via Discrete-Time Analytic" Cross-Correlation, IEEE Transactions on Signal Processing, vol. 47, No. 9, Sep. 1999.*

(Continued)

*Primary Examiner* — Pierre-Louis Desir
*Assistant Examiner* — Anne Thomas-Homescu
(74) *Attorney, Agent, or Firm* — Procopio, Cory, Hargreaves & Savitch LLP

(57) ABSTRACT

A noise reduction apparatus according to the present invention includes: a sudden sound information storage unit that stores an input signal that are input before a current input signal is input as sudden sound information, the input signal having a signal level of voice components equal to or smaller than a predetermined threshold and including a sudden sound to be suppressed; a phase difference calculation unit that calculates a phase difference between the sudden sound information and a sudden sound in the current input signal based on a maximum value of a correlation value between the sudden sound information and the current input signal; an addition signal generation unit that shifts a phase of the sudden sound information based on the phase difference to generate an addition signal; and a sudden sound suppression unit that adds the addition signal and the current input signal to output an output signal.

7 Claims, 12 Drawing Sheets

(51) Int. Cl.

| | |
|---|---|
| ***G10L 21/02*** | (2013.01) |
| ***G10L 19/00*** | (2013.01) |
| ***H04B 15/00*** | (2006.01) |
| ***G10L 21/0216*** | (2013.01) |
| *G10L 21/0224* | (2013.01) |
| *G10L 21/0264* | (2013.01) |

(56) References Cited

U.S. PATENT DOCUMENTS 6,636,375 B1 * 10/2003 Ding .................... G11B 5/5556 360/77.02
6,744,703 B2 * 6/2004 Saito ...................... G11B 20/24 369/30.18
9,100,735 B1 * 8/2015 Taenzer ................. H04R 3/005
2002/0118609 A1 * 8/2002 Saito ...................... G11B 20/24 369/30.18
2005/0185318 A1 * 8/2005 Auerbach ............ G11B 5/5547 360/75
2007/0055506 A1 * 3/2007 Bollano .............. G10L 21/0208 704/226
2007/0150261 A1 * 6/2007 Ozawa .................... G10L 21/01 704/200.1
2007/0253096 A1 * 11/2007 Alfred .................. G11B 5/5526 360/78.04
2008/0015853 A1 * 1/2008 Honda .................... G10L 25/78 704/228
2008/0019538 A1 * 1/2008 Kushner ................ A62B 18/08 381/94.1
2008/0154585 A1 * 6/2008 Yoshioka ................ G10L 25/87 704/213
2008/0228478 A1 * 9/2008 Hetherington .......... G10L 25/87 704/233
2008/0281589 A1 * 11/2008 Wang .................. G10L 21/0208 704/226
2009/0119097 A1 * 5/2009 Master ................. G10H 1/0008 704/207
2009/0216530 A1 * 8/2009 Fallat ...................... G10L 25/78 704/233
2009/0248409 A1 * 10/2009 Endo ................... G10L 21/0364 704/226
2010/0254541 A1 * 10/2010 Hayakawa .......... G10L 21/0208 381/71.1
2010/0260354 A1 * 10/2010 Ozawa ................ G10L 21/0208 381/94.4
2012/0035920 A1 * 2/2012 Hayakawa .......... G10L 21/0208 704/226
2012/0303362 A1 * 11/2012 Duni ....................... G10L 25/93 704/219
2013/0211831 A1 * 8/2013 Kumagai ................ G10L 21/02 704/226
2013/0218559 A1 * 8/2013 Yamabe .............. G10L 21/0216 704/226
2013/0328701 A1 * 12/2013 Sato ........................ G01S 3/808 340/943
2014/0177853 A1 * 6/2014 Toyama .............. G10L 21/0208 381/58
2014/0241532 A1 * 8/2014 Sato ..................... G10K 11/002 381/56
2014/0278388 A1 * 9/2014 Watson ................... G10L 25/63 704/231
2014/0350927 A1 * 11/2014 Yamabe .............. G10L 21/0232 704/233

FOREIGN PATENT DOCUMENTS

JP 2005-197956 A 7/2005
JP 2011205598 A 10/2011

OTHER PUBLICATIONS

JP Office Action dated May 16, 2017.

* cited by examiner

NOISE REDUCTION APPARATUS, NOISE REDUCTION METHOD, AND NOISE REDUCTION PROGRAM

INCORPORATION BY REFERENCE

This application is based upon and claims the benefit of priority from Japanese patent application No. 2014-053857, filed on Mar. 17, 2014, the disclosure of which is incorporated herein in its entirety by reference.

BACKGROUND OF THE INVENTION

1. Field of the Invention

The present invention relates to a noise reduction apparatus, a noise reduction method, and a noise reduction program, and more particularly, to a noise reduction apparatus, a noise reduction method, and a noise reduction program that suppress a sudden sound in an environment in which a sudden sound is periodically included in a voice signal.

2. Description of Related Art

When a mobile communication device is used in a noise environment, noise reduction processing may be required to secure the intelligibility of a voice. In particular, in an apparatus like a radio device that is frequently used in a harsh environment, a continuous periodic sudden sound like a vibration sound of an oxygen tank or a ground compressor in a construction site may overlap with a voice, which interrupts accurate transfer of the voice. Japanese Unexamined Patent Application Publication Nos. 2002-251823 and 2011-205598 disclose techniques related to noise reduction.

Japanese Unexamined Patent Application Publication No. 2002-251823 discloses a method of reducing a noise generated from a movable lens unit of a camera-integrated VTR, a noise generated when a head contacts a magnetic tape or the head is detached from the magnetic tape, a sound of an optical shutter in the camera-integrated VTR having a silver salt film camera function, and sudden sound at the time of the head seek that occurs during a recording in a rotary storage medium. Specifically, in Japanese Unexamined Patent Application Publication No. 2002-251823, signals are cut off only during a sudden sound section and information omitted during a cut-off section is interpolated based on signal information either before the cut-off section or after the cut-off section.

In Japanese Unexamined Patent Application Publication No. 2011-205598, an envelope line of a signal including a sudden noise is calculated, a signal corresponding to signal components of the sudden noise is extracted, and the signal components of the sudden noise are reduced based on the signal components of the sudden noise that are extracted.

SUMMARY OF THE INVENTION

There is a problem, however, in the techniques disclosed in Japanese Unexamined Patent Application Publication Nos. 2002-251823 and 2011-205598 that it is difficult to suppress a sudden sound while securing the intelligibility of a voice for an input signal in which a voice of a target sound and the sudden sound to be suppressed are mixed.

The present invention provides a noise reduction apparatus including: a sudden sound information storage unit that stores an input signal from among input signals that are input before a current input signal is input as sudden sound information, the input signal including voice equal to or smaller than a predetermined threshold and including a sudden sound to be suppressed; a correlation value calculation unit that calculates a correlation value between the sudden sound information and the current input signal; a phase difference calculation unit that calculates a phase difference between the sudden sound information and a sudden sound in the current input signal based on a maximum value of the correlation value; an addition signal generation unit that shifts a phase of the sudden sound information based on the phase difference and inverts the sudden sound information to generate an addition signal; and a sudden sound suppression unit that adds the addition signal and the current input signal and suppresses the sudden sound in the current input signal to output an output signal.

The present invention provides a noise reduction method in a noise reduction apparatus that suppresses a sudden sound included in an input signal to output an output signal, the method comprising: storing an input signal from among input signals that are input before a current input signal is input as sudden sound information, the input signal including voice equal to or smaller than a predetermined threshold and including a sudden sound to be suppressed; calculating a correlation value between the sudden sound information and the current input signal; calculating a phase difference between the sudden sound information and a sudden sound in the current input signal based on a maximum value of the correlation value; shifting a phase of the sudden sound information based on the phase difference and inverting the sudden sound information to generate an addition signal; and adding the addition signal and the current input signal and suppressing the sudden sound in the current input signal to output the output signal.

The present invention provides a noise reduction program executed in the operation unit in a noise reduction apparatus that includes the operation unit and a storage unit, and suppresses a sudden sound included in an input signal to output an output signal, the noise reduction program comprising: sudden sound information storing processing that stores an input signal from among input signals that are input before a current input signal is input as sudden sound information, the input signal having a signal level of voice components equal to or smaller than a predetermined threshold and including a sudden sound to be suppressed; correlation value calculation processing that calculates a correlation value between the sudden sound information and the current input signal; phase difference calculation processing that calculates a phase difference between the sudden sound information and a sudden sound in the current input signal based on a maximum value of the correlation value; addition signal generation processing that shifts a phase of the sudden sound information based on the phase difference and inverts the sudden sound information to generate an addition signal; and sudden sound suppression processing that adds the addition signal and the current input signal and suppresses the sudden sound in the current input signal to output the output signal.

The present invention provides a noise reduction apparatus, a noise reduction method, and a noise reduction program that achieve a high noise suppression effect regardless of the type of periodic noise.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Embodiment

Hereinafter, with reference to the drawings, embodiments of the present invention will be described. A noise reduction apparatus 1 according to a first embodiment outputs, when a sudden sound is periodically mixed into an input signal, an output signal obtained by suppressing a periodic noise in the input signal. Here is one example of the sudden sound that is periodically mixed. In an oxygen tank that a firefighter carries when performing activities at a fire site, a warning is given to the firefighter when the contents of the oxygen tank becomes equal to or lower than a predetermined value. The sudden sound that is periodically mixed into an input signal is caused by a function of generating a continuous and periodic sudden sound like a warning vibration sound. The periodic sudden sound is generated by a ground compressor in a construction site.

Figure 1:
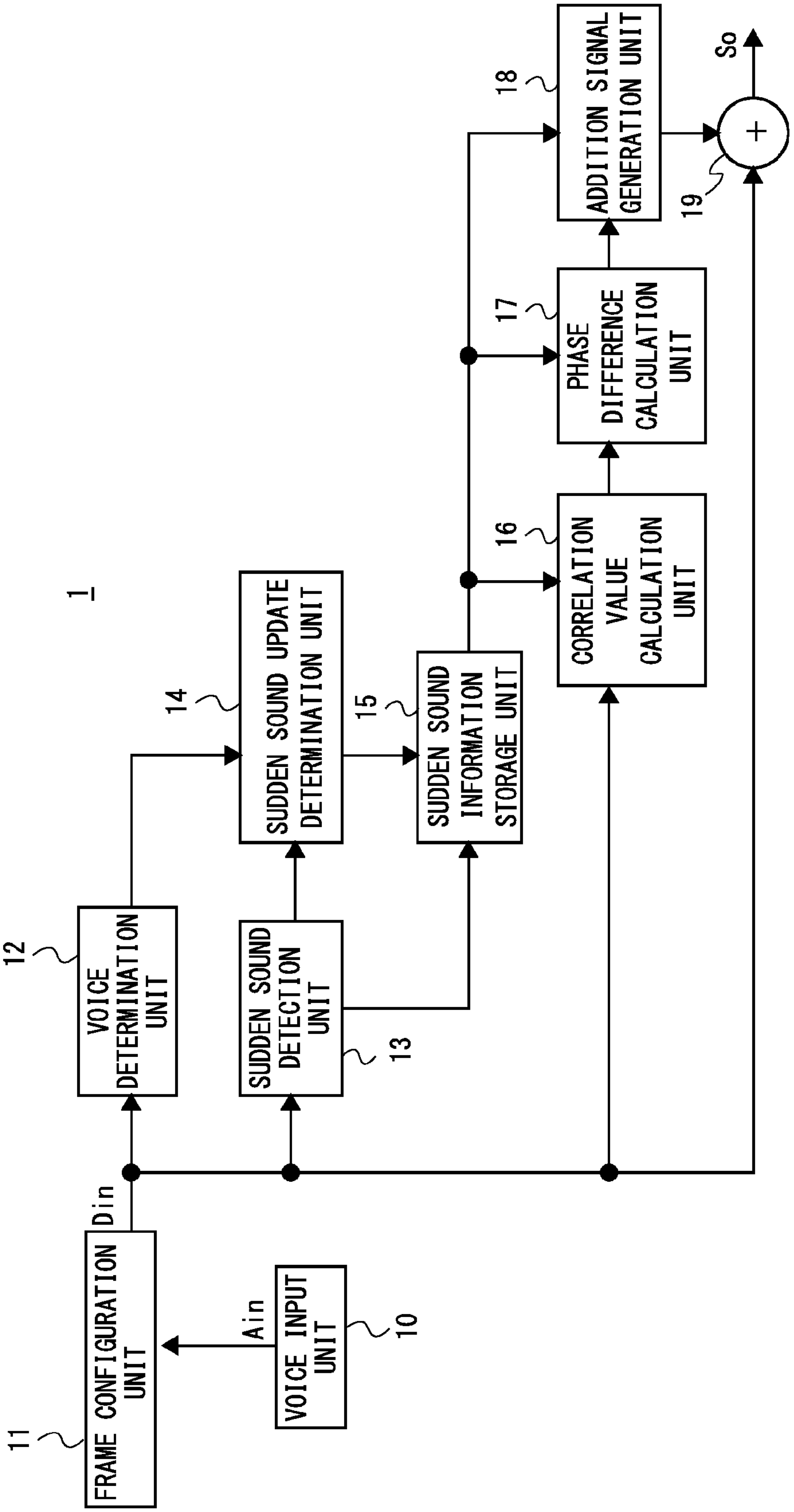
FIG. 1 is a block diagram of a noise reduction apparatus according to a first embodiment.

FIG. 1 shows a block diagram of the noise reduction apparatus 1 according to the first embodiment. As shown in FIG. 1, the noise reduction apparatus 1 according to the first embodiment includes a voice input unit 10, a frame configuration unit 11, a voice determination unit 12, a sudden sound detection unit 13, a sudden sound update determination unit 14, a sudden sound information storage unit 15, a correlation value calculation unit 16, a phase difference calculation unit 17, an addition signal generation unit 18, and a sudden sound suppression unit 19.

The noise reduction apparatus 1 includes the voice input unit 10 and a storage unit storing various items of information formed by hardware. Further, in the noise reduction apparatus 1, processing performed on information or signals by the frame configuration unit 11, the voice determination unit 12, the sudden sound detection unit 13, the sudden sound update determination unit 14, the correlation value calculation unit 16, the phase difference calculation unit 17, the addition signal generation unit 18, and the sudden sound suppression unit 19 may be achieved by a program (e.g., noise reduction program) executed by an operation unit such as a CPU (Central Processing Unit) or a DSP (Digital Signal Processor). In this case, the noise reduction program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line. Each component implemented by the program may be formed by hardware.

The voice input unit 10 is a sensor such as, for example, a microphone, and acquires a voice signal from outside. An input signal Ain acquired by the voice input unit 10 is an analog signal. The frame configuration unit 11 converts the input signal Ain into a digital value, frames the input signal by a unit according to the number of samples that is set in advance, and outputs an input signal Din. The conversion from the analog signal into the digital value may be executed either in the voice input unit 10 or the frame configuration unit 11. The input signal Din output from the frame configuration unit 11 is transmitted to the subsequent components and processing of reducing the sudden sound is executed.

The voice determination unit 12 determines whether a current input signal includes a voice, which is a component not to be suppressed. When it is determined that the voice component is not included in the current input signal, the voice determination unit 12 enables a voice determination signal.

The sudden sound detection unit 13 detects whether the sudden sound to be suppressed is included in the current input signal. When it is determined that the sudden sound is included in the current input signal, the sudden sound detection unit 13 enables the sudden sound detection signal.

The sudden sound information storage unit 15 stores an input signal from among input signals that are input before the current input signal is input as sudden sound information, the input signal having a signal level of voice components equal to or smaller than a predetermined threshold and including a sudden sound to be suppressed. This sudden sound information cancels the sudden sound of the input signal and is stored as a reference signal. When it is determined in the voice determination unit that a voice is not included in the current input signal and a sudden sound is detected by the sudden sound detection unit 13, the sudden sound update determination unit 14 updates the sudden sound information stored in the sudden sound information storage unit 15 with the current input signal. More specifically, when both of the voice determination signal and the sudden sound detection signal are enabled, the sudden sound update determination unit 14 instructs in the sudden sound information storage unit 15 to update the sudden sound information stored in the sudden sound information storage unit 15. To update the sudden sound information, the sudden sound update determination unit 14 obtains information on a sudden sound section including sudden sound from the sudden sound detection unit 13, and instructs the sudden sound information storage unit 15 to set the current input signal in the sudden sound section according to the sudden sound section information as the sudden sound information after updating.

When the sudden sound update determination unit 14 determines that the sudden sound and the voice signal are included in the current input signal or the sudden sound is not included in the current input signal, the sudden sound information storage unit 15 continues to store the sudden sound information.

The correlation value calculation unit 16 calculates a correlation value between the sudden sound information stored in the sudden sound information storage unit 15 and the current input signal. More specifically, when it is determined by the sudden sound detection unit 13 that the sudden sound is included in the current input signal, the correlation value calculation unit 16 calculates the correlation value between the sudden sound information and the current input signal and outputs the resulting correlation value to the phase difference calculation unit 17.

The correlation value is calculated based on, for example, the expression (1).

$$A[m] = \frac{1}{N}\sum_{n=0}^{N-1} x[n]\cdot x[n-m],\ m = 0, 1, \ldots, N-1 \tag{1}$$

In the expression (1), m and n represent natural numbers, m represents a range (time width) to calculate an autocorrelation value from an input signal sequence and is a value corresponding to a phase difference between the current input signal and an input signal included in a previous input signal, N represents a constant number and a maximum phase difference (search range), n represents the number of samples of the input signal sequence to calculate the autocorrelation value, x represents a framed input signal, and A[m] represents the autocorrelation value in the phase difference m.

The phase difference calculation unit 17 calculates a phase difference between the sudden sound information and the sudden sound in the current input signal based on the maximum value of the correlation value calculated by the correlation value calculation unit 16. The phase difference calculation unit 17 outputs the phase difference information that is calculated to the addition signal generation unit 18.

The addition signal generation unit 18 shifts the phase of the sudden sound information based on the phase difference information output from the phase difference calculation unit 17 to generate a noise canceling signal. The addition signal generation unit 18 generates a signal obtained by inverting the sudden sound information as the noise canceling signal. Since the noise canceling signal is used as a signal added to the current input signal, the noise canceling signal is called an addition signal in the following description.

The sudden sound suppression unit 19 adds the addition signal and the current input signal, suppresses the sudden sound in the current input signal, and outputs an output signal So. In the first embodiment, an adder is used as the sudden sound suppression unit 19.

Subsequently, an operation of the noise reduction apparatus 1 according to the first embodiment will be described in detail. The noise reduction apparatus 1 according to the first embodiment executes the sudden sound suppression processing and the sudden sound information update processing every time the input signal Din is input. In the sudden sound suppression processing, the sudden sound is suppressed using the sudden sound information acquired based on the input signal that is previously input. In the sudden sound information update processing, the sudden sound information is updated with the input signal input in a non-voice section in which voice components that are not to be suppressed become equal to or lower than a threshold.

Figure 2:
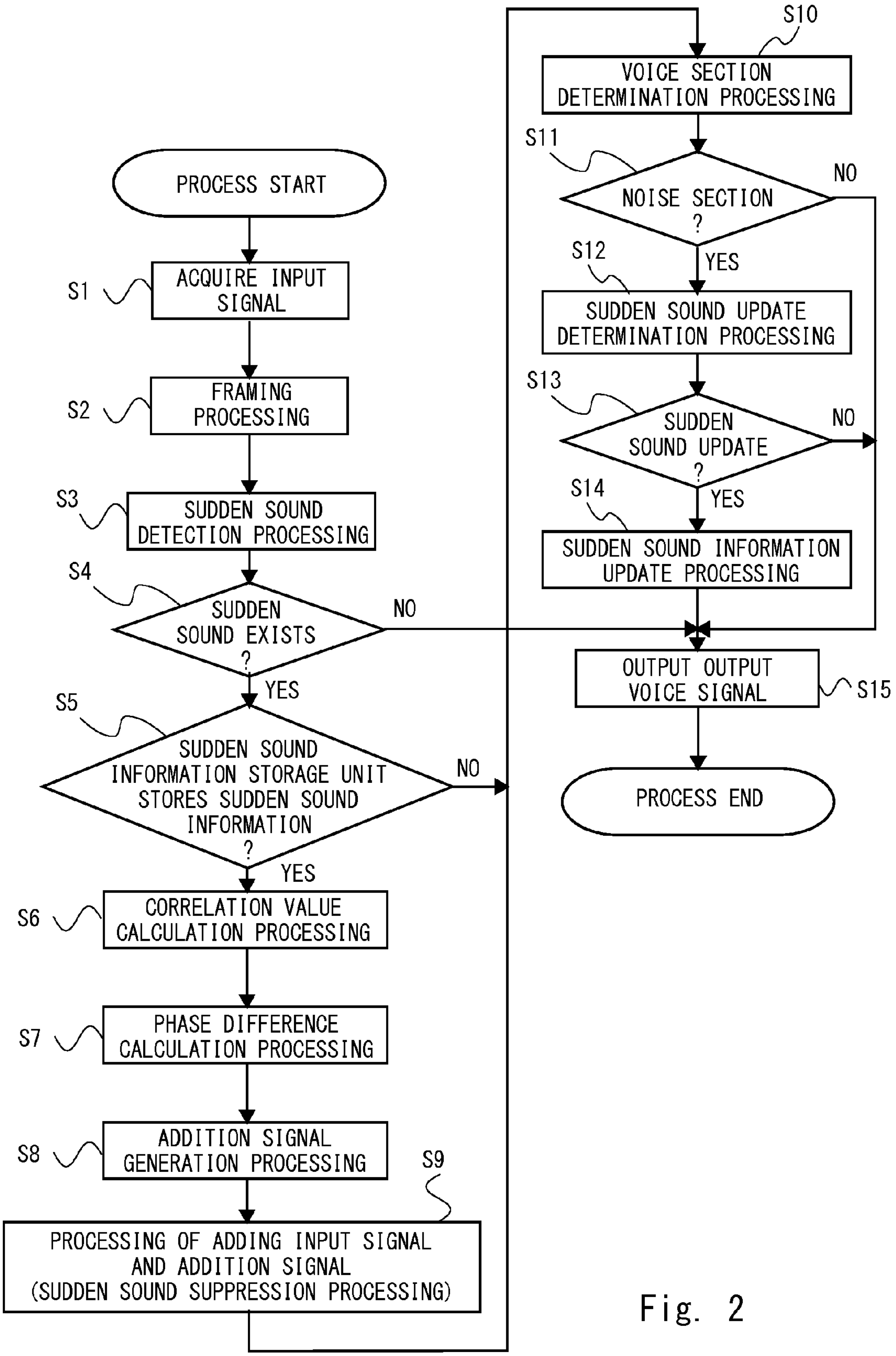
FIG. 2 is a flowchart showing an operation of the noise reduction apparatus according to the first embodiment.
Figure 3:
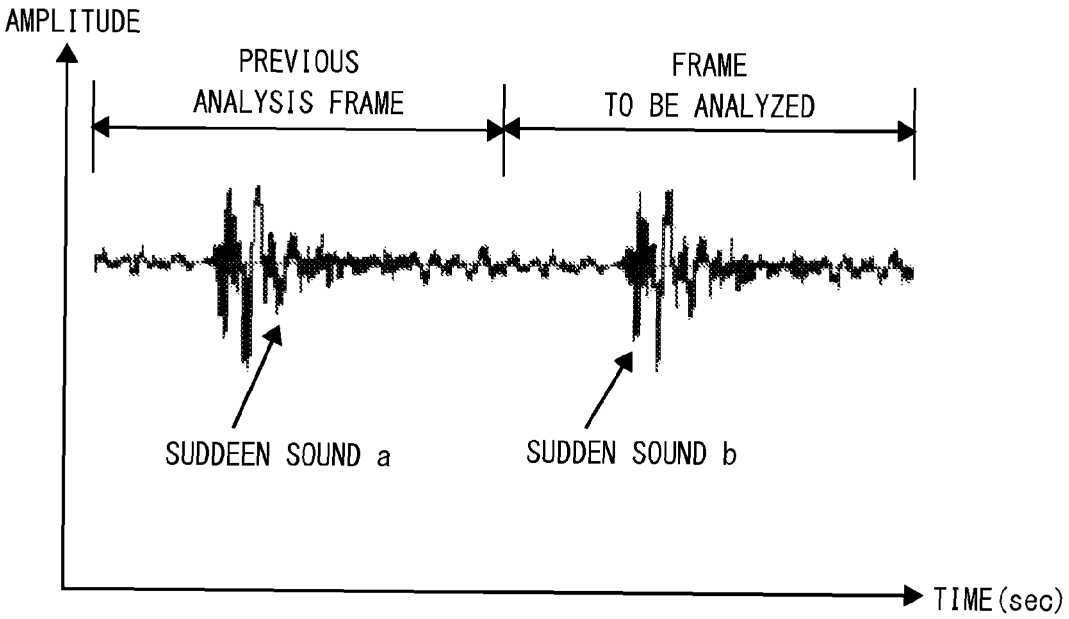
FIG. 3 is a diagram showing one example of an input signal input to the noise reduction apparatus according to the first embodiment.

FIG. 2 is a flowchart showing an operation of the noise reduction apparatus 1 according to the first embodiment. In FIG. 2, Steps S1-S9 and S15 correspond to the sudden sound suppression processing, and Steps S10-S14 correspond to the sudden sound information update processing. In order to describe the sudden sound suppression processing in the noise reduction apparatus 1 according to the first embodiment in detail, FIG. 3 shows one example of the input signal input to the noise reduction apparatus according to the first embodiment. As shown in FIG. 3, in the noise reduction apparatus 1 according to the first embodiment, the input signal Din is input. Further, the input signal Din includes a sudden sound. The noise reduction apparatus 1 according to the first embodiment stores a sudden sound a included in a previous analysis frame as the sudden sound information, and reduces a sudden sound b of the current frame to be analyzed using the sudden sound information.

As shown in FIG. 2, in the noise reduction apparatus 1 according to the first embodiment, when processing is started, the input signal Ain is first acquired (Step S1). The noise reduction apparatus 1 then frames the input signal Ain by the frame configuration unit 11 to generate the input signal Din (Step S2).

Now, one frame time in the framing processing in Step S2 will be described. In this exemplary embodiment, as one example, a periodic hitting sound caused by a mask (regulator) vibrating when a remaining oxygen amount in an oxygen tank used by a firefighter becomes small is considered as the sudden sound to be detected. This sudden hitting sound has a time width of about 0.01 sec from its rising point to its falling point, with the peak position being where the sound pressure level is the highest. In order to detect the existence of the sudden sound, it is required to secure an acoustic signal analysis section which is not related to the sudden sound before and after the sudden sound and to observe, for example, changes in an amplitude change amount or an energy change amount. Accordingly, with the time width several times longer than 0.01 sec (e.g., 0.03-0.05 sec), it is possible to detect the existence of the sudden sound to be detected. These values are therefore preferable for the analysis width specified as one frame time.

The section of the frame is not limited to the above numerical values and may be changed according to the system. It is understood that the hit sound caused due to a collision of objects is concentrated on a limited duration time determined according to the collided objects, and falls within a predetermined range. Accordingly, a time width several times longer than the duration time of the sudden sound caused by the collision as the analysis width is efficiently secured by the short-time analysis (the number of samples in a frame).

Subsequently, the noise reduction apparatus 1 according to the first embodiment determines by the sudden sound detection unit 13 whether a sudden sound is included in the input signal Din (Step S3). Various methods may be used as the sudden sound detection method in the sudden sound detection processing in Step S3. It is desirable to employ a method of obtaining a correlation value from a current input signal and a previous input signal for a peak duration time and a peak position of a signal amplitude in a frame, which is disclosed in Japanese Patent Application No. 2013-145548 filed by the present inventors for the purpose of improving an accuracy of detecting a sudden periodic sound.

When it is determined in Step S3 that the sudden sound is included in the input signal Din (Y in Step S4), it is determined whether the sudden sound information storage unit 15 includes the sudden sound information (Step S5). Meanwhile, when it is determined in Step S3 that the sudden sound is not included in the input signal Din (N in Step S4), the noise reduction apparatus 1 directly outputs the input signal Din as the output signal So (Step S15).

When it is determined in Step S5 that the sudden sound information is not included in the sudden sound information storage unit 15 (N in Step S5), the noise reduction apparatus 1 executes sudden sound information update processing. In addition, when the sudden sound information is not included in said unit, the addition signal required for the suppression cannot be prepared. In this case, the noise reduction apparatus 1 directly outputs the input signal Din as the output signal So (Step S15). Meanwhile, when it is determined in Step S5 that the sudden sound information has already been stored in the sudden sound information storage unit 15 (Y in Step S5), the noise reduction apparatus 1 executes processing of Steps S6-S9.

In Step S6, the correlation value calculation unit 16 calculates a correlation value between the sudden sound information stored in the sudden sound information storage unit 15 and the input signal Din which is the current frame to be analyzed. This correlation value is calculated, for example, based on the above expression (1).

In Step S7, based on the correlation value calculated in the correlation value calculation processing in Step S6, a phase difference between the sudden sound information stored in the sudden sound information storage unit 15 and the sudden sound in the current input signal Din is calculated to generate the phase difference information.

Figure 4:
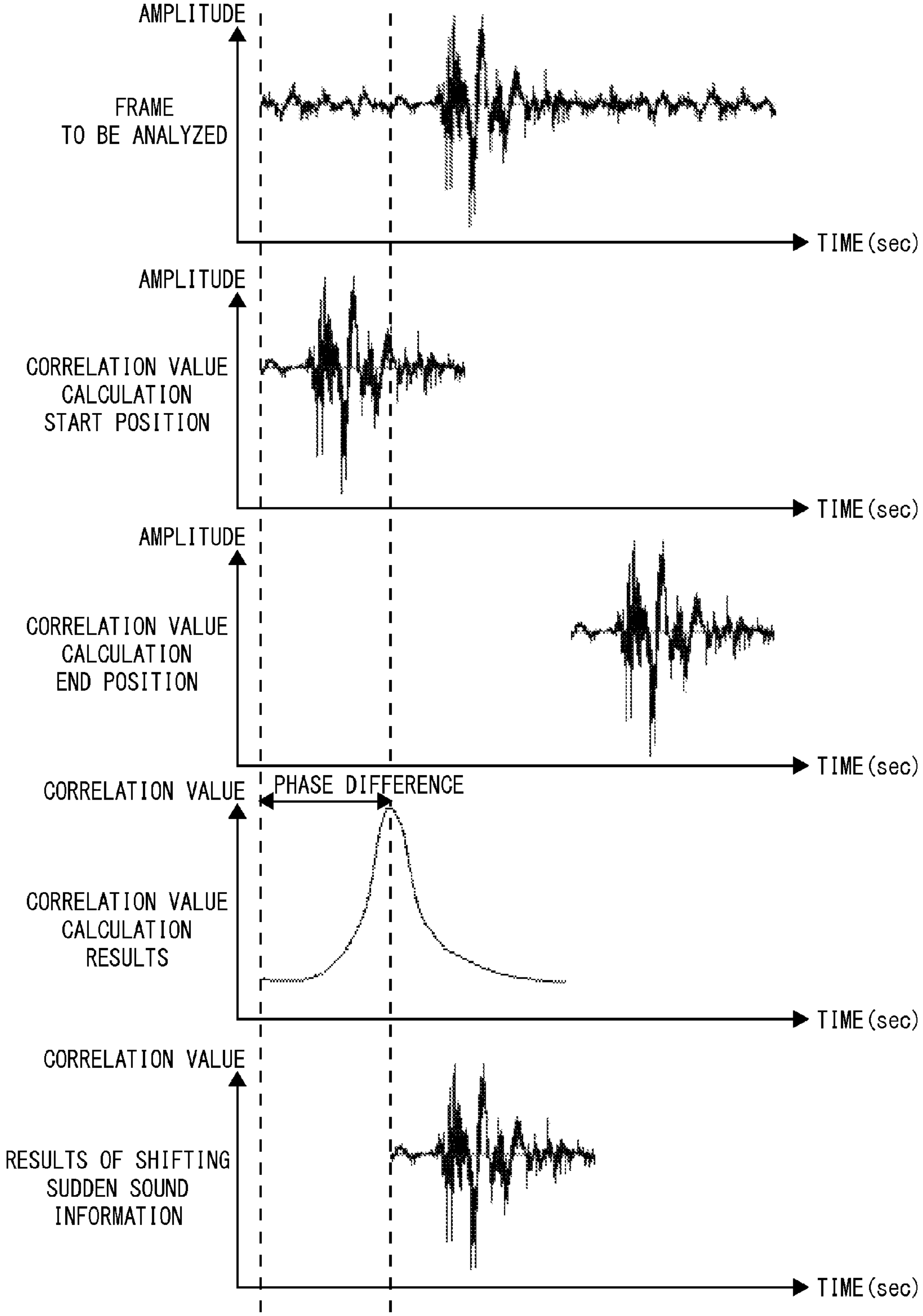
FIG. 4 is a diagram describing a relation between sudden sound information and correlation values in the noise reduction apparatus according to the first embodiment.

FIG. 4 shows a diagram describing a relation between the sudden sound information and the correlation values in the noise reduction apparatus according to the first embodiment. With reference to FIG. 4, the phase difference information will be described in more detail. In the noise reduction apparatus 1, the correlation value calculation unit 16 first calculates the correlation value while shifting the sudden sound information that is stored from a correlation value calculation start position to a correlation value calculation end position for the frame to be analyzed (current input signal Din). When the sudden sound is included in the current input signal Din, as shown in correlation value calculation results in FIG. 4, the correlation value becomes large at a position where the sudden sound in the current input signal Din overlaps with the sudden sound information. In summary, the signal components of the sudden sound can be suppressed in the most efficient way when the sudden sound information is shifted by the amount corresponding to the phase difference to a position at which the peak position of the correlation value becomes the highest, and then the sign is inverted to perform addition processing. The phase difference calculation unit 17 calculates the distance to the peak of the correlation value (e.g., the number of samples) and output the resulting value to the addition signal generation unit 18 as the phase difference information.

When the phasing of the sudden sound information and the sudden sound of the frame to be analyzed is not sufficiently performed, the amplitude may increase, and the noise level may increase or a new noise may be added. The accuracy of the phase difference information strongly depends on the sudden sound suppression capability.

Subsequently, in Step S8, the addition signal generation unit 18 executes addition signal generation processing. One example of the addition signal generation processing will be described in detail. Reference is first made to FIG. 4. As shown in FIG. 4, in order to suppress the sudden sound in the current input signal Din in the most efficient way, it is required to shift the sudden sound information to a position shifted based on the phase difference information. The addition signal generation unit 18 shifts the phase of the sudden sound information based on the expression (2).

$$\left.\begin{array}{ll} B[i]=0 & (i=0\sim i<s) \\ B[i]=-(x[t-s]) & (i\leqq s\sim i<(s+t)) \\ B[i]=0 & (i\leqq(s+t)\sim i<\text{the number of frame samples}) \end{array}\right\} \quad (2)$$

Figure 5:
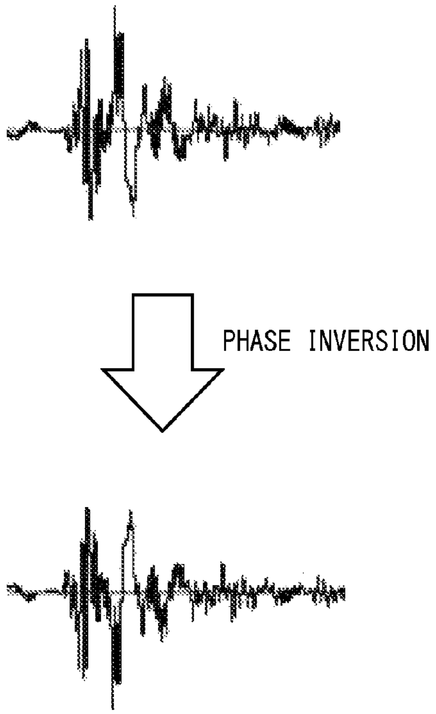
FIG. 5 is a diagram describing a relation between sudden sound information and an addition signal obtained by inverting the sudden sound information in the noise reduction apparatus according to the first embodiment.

In the expression (2), B represents the addition signal, x represents the sudden sound information that is stored, i represents the sample number in one frame, s represents the phase difference information, and t represents the total number of samples in the sudden sound information. In short, the addition signal generation unit 18 shifts the sudden sound information to a position indicated by the phase difference information and inverts the sudden sound information to generate the addition signal. FIG. 5 shows a diagram describing a relation between the sudden sound information and the addition signal obtained by inverting the sudden sound information in the noise reduction apparatus according to the first embodiment. In FIG. 5, the upper part indicates the sudden sound information and the lower part indicates the addition signal. As shown in FIG. 5, the sudden sound signal and the addition signal are inverted in relation to each other.

The addition signal generation unit 18 may add the sign inverted signal of the sudden sound information that is stored (i.e., addition signal) to the corresponding part of the input signal in the frame to be analyzed specified from the shift amount based on the phase difference information.

In Step S9, the sudden sound suppression unit 19 executes processing of adding the input signal and the addition signal, i.e., sudden sound suppression processing. In this way, the output signal with a suppressed sudden sound included in the current input signal Din is generated. In the noise reduction apparatus 1, the processing of updating the sudden sound information is executed after Step S9.

In the processing of updating the sudden sound information, the voice determination unit 12 first executes voice section determination processing (Step S10). Various methods may be employed as the method of the voice section determination processing in Step S10. One method includes a method of determining voice signal components based on spectrum components of an input signal disclosed in Japanese Unexamined Patent Application Publication No. 2012-128411, which has already been filed by the present inventors. In Step S10, when a voice is included in the current input signal Din, the voice determination unit 12 determines that this section is a voice section and disables the voice determination signal (N in Step S11). When the voice determination signal is in the disable state, the sudden sound update determination unit 14 instructs the sudden sound information storage unit 15 to continuously hold the sudden sound information stored in the sudden sound information storage unit 15.

Meanwhile, when it is determined in Step S10 that the current input signal Din does not include a voice having an amplitude equal to or larger than a threshold that is set in advance, the voice determination unit 12 determines that the section is a noise section to enable the voice determination signal (Y in Step S11). In this way, both of the voice determination signal and the sudden sound detection signal are enabled, and the sudden sound update determination unit 14 determines in the sudden sound update determination processing that the sudden sound is updated (Y in Step S13).

Figure 6:
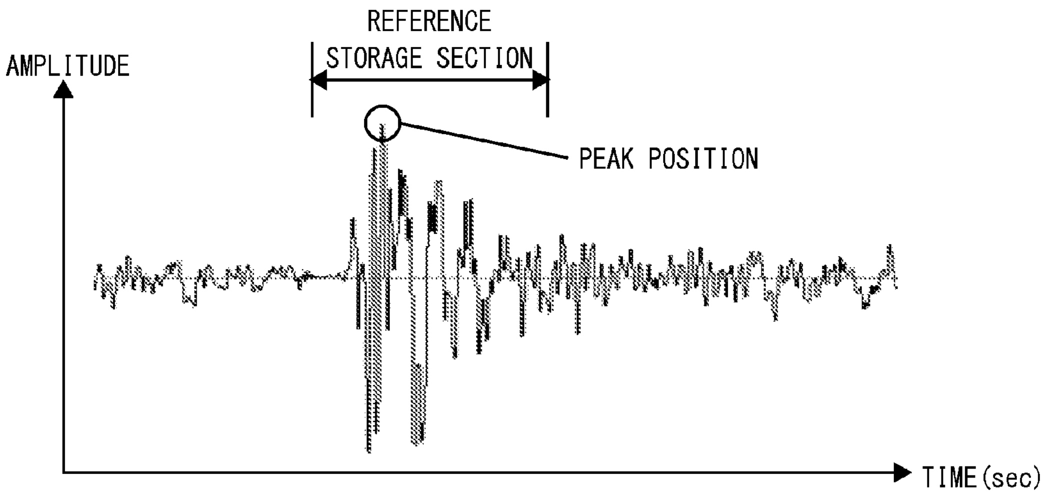
FIG. 6 is a diagram describing a range of an input signal stored as the sudden sound information in the noise reduction apparatus according to the first embodiment.

The information stored as the sudden sound information will be described in detail. FIG. 6 shows a diagram describing a range of the input signal stored as the sudden sound information in the noise reduction apparatus according to the first embodiment. In the noise reduction apparatus 1 according to the first embodiment, in order to reduce only the sudden sound, only a reference storage section of the sudden sound shown in FIG. 6 is stored. As shown in FIG. 6, the amplitude of the sudden sound abruptly increases, decays with time, and goes back to a normal signal level after the reference storage section. Accordingly, in order to set the reference storage section, the peak position (maximum value) of the sudden sound is detected and the samples for a predetermined section of the sudden sound from among several samples before and after the peak position may be set.

In the sudden sound update processing, the sudden sound update determination unit 14 instructs the sudden sound information storage unit 15 to update the sudden sound information with the current input signal Din, and the sudden sound information storage unit 15 updates the stored information with the current input signal Din. When the processing of Step S14 is completed, the noise reduction apparatus 1 outputs the output signal So (Step S15).

A method of avoiding a false determination in the sudden sound update determination processing in Step S12 stated above will now be described. Depending on the usage environment in which an acoustic signal is picked up, various background noises are mixed in addition to a voice and sudden sound. Therefore, despite the fact that the voice is included, the voice may be wrongly determined as being a noise in the determination by the voice section determination processing in Step S10. When the reference signal is updated in a situation in which the false determination occurs, a voice is mixed into the sudden sound information, which causes harmful effects. Further, in general, it is hard to recognize a head part and an end part of the voice signal generated by a speech as a voice, and thus it is highly likely that a false determination will be made. By generating the input signal Din by divided frames each having a certain analysis period, it is expected that the voice signal generated by the speech will be frequently split between frames. A method of avoiding the influence of the false determination of the voice section as described above will be described.

Figure 7:
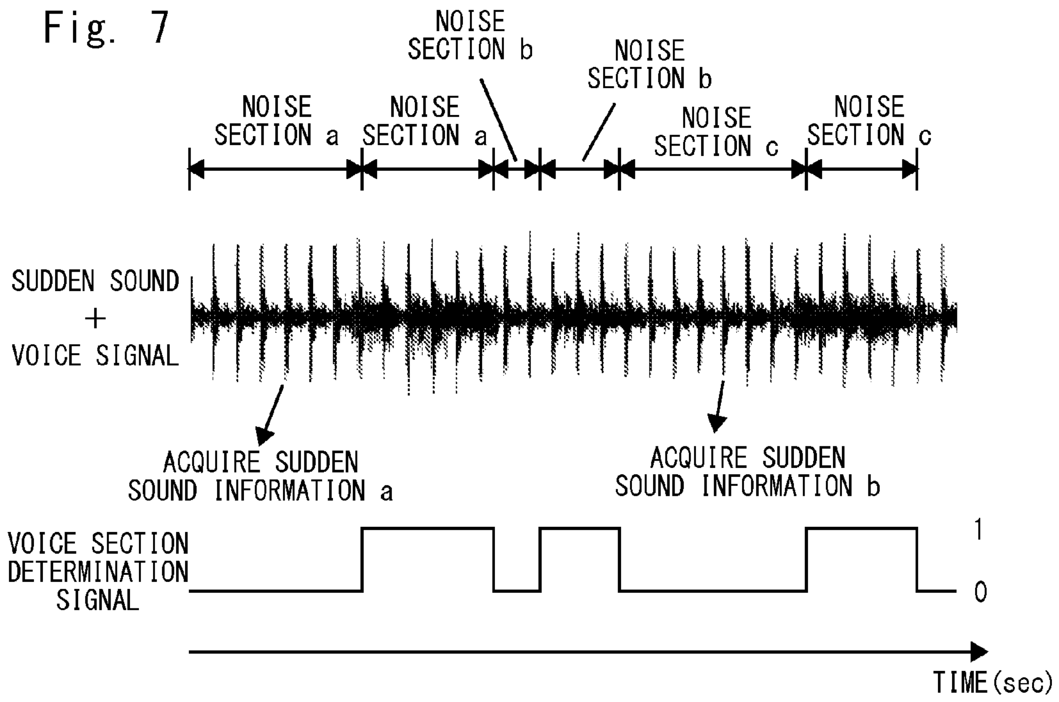
FIG. 7 is a diagram describing processing of updating the sudden sound information in the noise reduction apparatus according to the first embodiment.

With reference to FIG. 7, a method of storing the sudden sound information in the first embodiment will be described. FIG. 7 is a diagram describing processing of updating the sudden sound information in the noise reduction apparatus according to the first embodiment. The upper part of FIG. 7 indicates acoustic signals including a voice and a sudden sound, and the lower part of FIG. 7 indicates results of a voice section determination. In the results of the voice section determination, 1 indicates a voice section and 0 indicates a noise section. In the first embodiment, in order to avoid the situation in which a voice is mixed into the sudden sound information stored in the sudden sound information storage unit 15, the reference signal is updated when the noise (sudden sound) section is continued for several frames. Since a noise section a continues for a predetermined number of frames, the sudden sound information is updated. Meanwhile, in a voice section a, the rising of the voice cannot be recognized as being a voice. When the sudden sound immediately before the voice section a is stored, it may be possible that the voice will be mixed. In order to avoid this situation, instead of storing the sudden sound immediately before the voice section a, the input signal Din several frames before the voice section a is stored or updated as the sudden sound information a. Subsequently, since the voice is mixed in the voice section a, neither storage nor update is executed. Since the noise section is short in a noise section b and the reliability that the noise section b will only include the sudden sound is low, neither storage nor update is executed. Since the voice is mixed in a voice section b, neither storage nor update is executed. Since the noise (sudden sound) section is continued for a predetermined number of frames in a noise section c, the input signal Din several frames before a voice section c is stored as a sudden sound signal b. Since voice is mixed in the voice section c, neither storage nor update is executed.

As described above, in the first embodiment, as shown in FIG. 7, in order to avoid the situation in which a voice is included in the sudden sound information, when the noise section is continued for a predetermined number of frames, the sudden sound which is at the position other than a rising part or a falling part of the voice signal is stored as the sudden sound information.

Further, in the first embodiment, the sudden sound information stored in the sudden sound information storage unit 15 is updated as needed. When the sudden sound which is older than the frame to be analyzed is used as the reference signal, the correlation may not be sufficiently secured depending on surrounding environmental changes. Even when the peak position of the correlation value is detected and the phase shift between the sudden sound and the frame to be analyzed is absorbed, the addition signal generated for reducing the sudden sound may not be able to efficiently suppress the sudden sound which is to be analyzed. Accordingly, the sudden sound information is updated as needed when it is determined that there is an extremely low possibility that the voice signal is included and a temporally new reference sound is secured.

From the above description, it is seen that in the noise reduction apparatus 1 according to the first embodiment, an input signal is stored in the sudden sound information storage unit 15 from among input signals that are input before the current input signal is input as the sudden sound information, the input signal having a signal level of voice components equal to or smaller than a predetermined threshold and including a sudden sound to be suppressed. The noise reduction apparatus 1 suppresses the sudden sound included in the current input signal Din based on the sudden sound information. Accordingly, the noise reduction apparatus 1 according to the first embodiment is able to suppress the sudden sound while preventing the degradation of the voice.

More specifically, in the noise reduction apparatus 1 according to the first embodiment, sudden sound information is generated from an input signal that does not include a voice from among previous input signals, and the addition signal obtained by inverting the sudden sound information is added to the current input signal Din, thereby suppressing the sudden sound. Accordingly, in the noise reduction apparatus 1, a voice signal is not suppressed, and it is possible to suppress only the sudden sound while keeping the intelligibility of the voice.

One representative method of the noise reduction processing that is widely known is adaptive noise reduction processing using an adaptive filter. This adaptive filter is adaptable so that it is possible to change the filter characteristics according to environmental changes while adequately correcting the filter characteristics, which makes it possible to constantly keep the optimality of the filter characteristics according to the environmental changes. In the noise reduction processing using the adaptive filter, a filter coefficient according to the circumstances is adequately changed and adapted while operating the filter to cut off only the noise components that change depending on the position and the time using these characteristics, thereby reducing ambient noise. However, when the noise reduction processing by the adaptive filter described above is carried out when the periodic sudden sound or the like is reduced, the adaptive noise reduction processing is carried out also for the periodic sudden noise and the adaptive signal processing circuit (parenthesis-adaptive filter circuit) is constantly operated, which causes problems that the number of taps of the adaptive signal processing circuit increases and the size of the circuit of the adaptive signal processing circuit increases.

Meanwhile, in the noise reduction apparatus 1 according to the first embodiment, the sudden sound to be suppressed and the inverted signal of the sudden sound information which is close to the sudden sound are simply added, whereby it is possible to greatly reduce the size of the circuit compared to the reduction of the same in the method using the adaptive filter.

Second Embodiment

Figure 8:
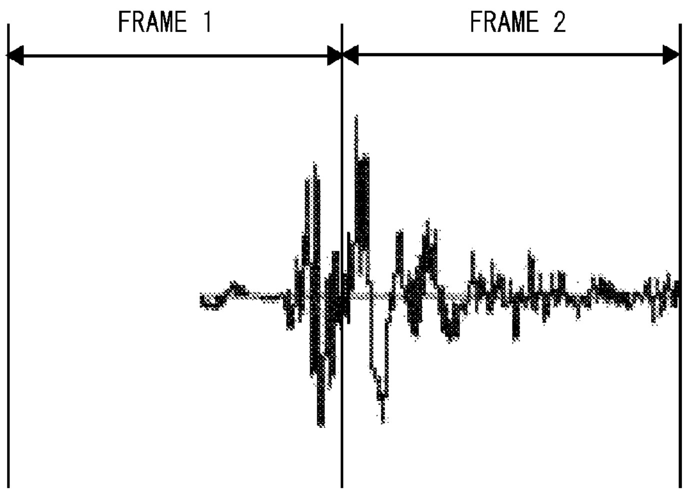
FIG. 8 is a diagram describing an input signal used in a noise reduction apparatus 2 according to a second embodiment.
Figure 9:
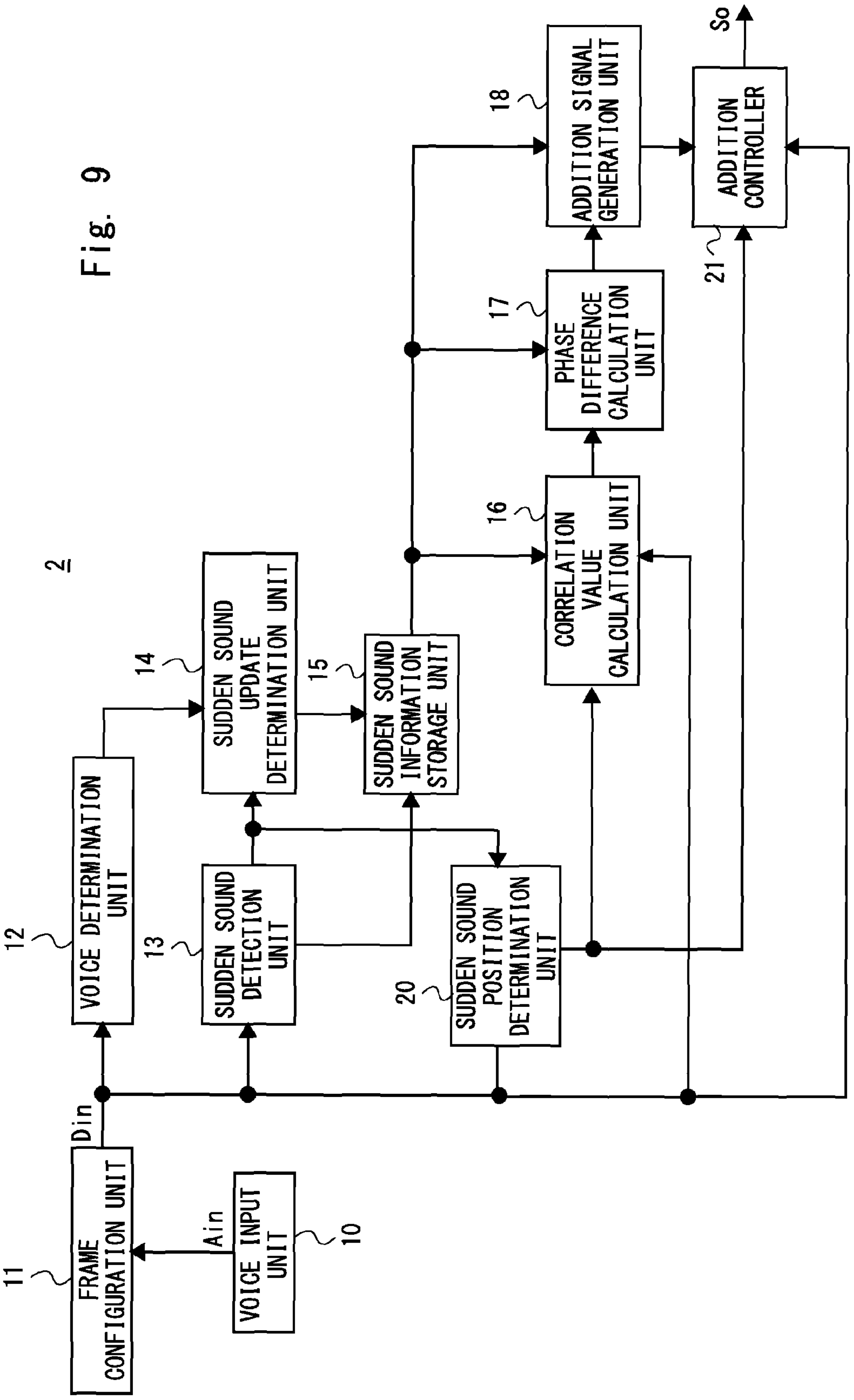
FIG. 9 is a block diagram of the noise reduction apparatus according to the second embodiment.

In a second embodiment, a noise reduction apparatus 2 which is another form of the noise reduction apparatus 1 according to the first embodiment will be described. A sudden sound used in the noise reduction apparatus 2 according to the second embodiment will be described first. FIG. 8 shows a diagram describing an input signal used in the noise reduction apparatus 2 according to the second embodiment. As shown in FIG. 8, in the noise reduction apparatus 2 according to the second embodiment, a sudden sound exists across frames. In the noise reduction apparatus 2 according to the second embodiment, the sudden sound that exists across frames as shown in FIG. 8 is suppressed. FIG. 9 shows a block diagram of the noise reduction apparatus 2 according to the second embodiment. In the description of the second embodiment, the same components as those described in the first embodiment are denoted by the same reference symbols as in the first embodiment and the descriptions will be omitted.

As shown in FIG. 9, in the noise reduction apparatus 2 according to the second embodiment, a sudden sound position determination unit 20 is added to the noise reduction apparatus 1 according to the first embodiment, and the sudden sound suppression unit 19 is replaced with an addition controller 21. The addition controller 21 corresponds to a sudden sound suppression unit.

The sudden sound position determination unit 20 determines whether a sudden sound exists across a current input signal and a previous input signal that is input in a process cycle just before the process cycle of inputting the current input signal. When the sudden sound position determination unit 20 detects that the sudden sound is located across the current input signal and the previous input signal, the addition controller 21 executes on the previous input signal and the current input signal processing for suppressing the sudden sound to which the addition signal is applied to output the output signal So corresponding to the previous input signal. Further, when the sudden sound position determination unit 20 detects that the sudden sound is located across the current input signal and the previous input signal, the addition controller 21 validates a suppression process completion flag indicating that the suppression processing has already been performed on the current input signal.

Figure 10:
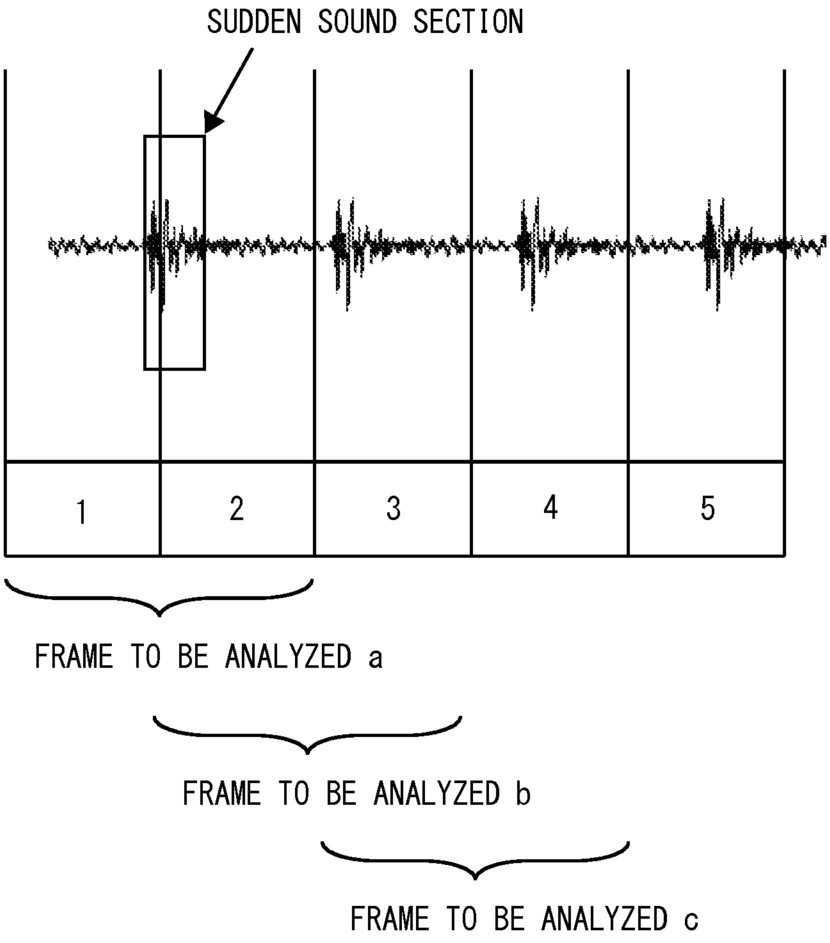
FIG. 10 is a diagram describing a relation between an input signal and a frame to be analyzed in a case in which a sudden sound exists across frames.

In the noise reduction apparatus 2 according to the second embodiment, the sudden sound which exists at a location across frames is also suppressed. The frame configuration unit 11 therefore outputs temporally successive two frames as one data. FIG. 10 shows a diagram describing frames to be processed according to the second embodiment. In the frame configuration unit 11 according to the second embodiment, frames 1 and 2 are output as one frame to be analyzed a, and when a frame 3 is generated, the frames 2 and 3 are output as one frame to be analyzed b. A frame to be analyzed c subsequent to the frame to be analyzed b includes frames 3 and 4. Further, in the following description, taking the frame to be analyzed a shown in FIG. 10 as an example, the frame 1 (first-half frame) that is input first is represented as the previous input signal, and the frame 2 (second-half frame) that is input just after the frame 1 is represented as the current input signal.

Further, the voice determination unit 12 determines the presence or absence of a voice using a signal of two frames that is input. The sudden sound detection unit 13 detects a sudden sound using two input frames that are input as one input signal.

When a sudden sound exists without being arranged across frames, the sudden sound update determination unit 14 determines whether to allow update of the sudden sound information according to the voice determination signal of the first-half frame of the input signal. Meanwhile, when sudden sound exists across frames, the sudden sound update determination unit 14 suspends update of the sudden sound information at the time of processing of the frame to be analyzed a, the presence or absence of the voice signal of the second-half frame of the frame to be analyzed a is determined when the frame to be analyzed b is input, and then it is determined whether to allow update of the sudden sound information. In summary, in the second embodiment, when it is determined by the sudden sound position determination unit 20 that a sudden sound exists across the current input signal and the previous input signal and it is determined that a voice is not included in either of the current input signal and the previous input signal, the sudden sound update determination unit 14 updates the sudden sound information with the current input signal and the previous input signal. Meanwhile, when it is determined by the sudden sound position determination unit 20 that a sudden sound exists in the previous input signal without being arranged across the current input signal and the previous input signal and it is determined that a voice is not included in the previous input signal, the sudden sound update determination unit 14 updates the sudden sound information with the previous input signal.

Further, when it is determined in the sudden sound position determination unit 20 that the sudden sound is located across the current input signal and the previous input signal, the correlation value calculation unit 16, the phase difference calculation unit 17, and the addition signal generation unit 18 generate the addition signal using the current input signal and the previous input signal as one input signal.

Figure 11:
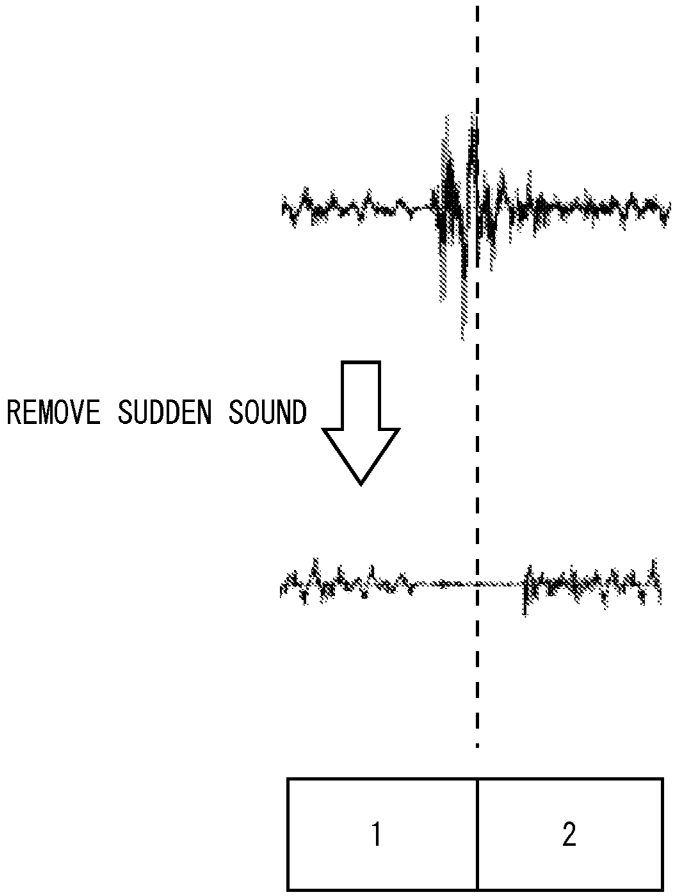
FIG. 11 is a diagram describing an output signal when sudden sound suppression processing is performed for an input signal in which a sudden sound exists across frames.
Figure 12:
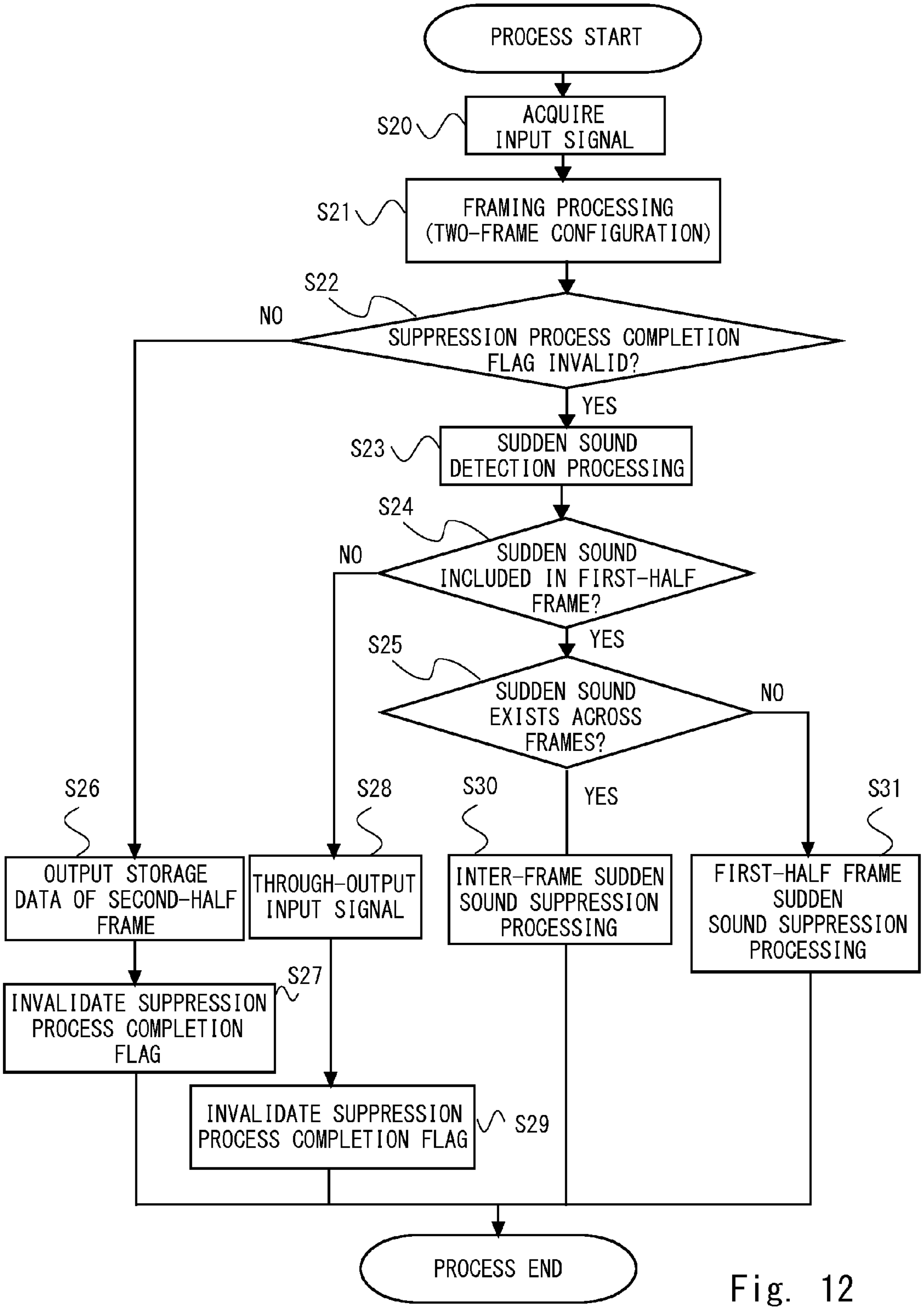
FIG. 12 is a flowchart showing an operation of the noise reduction apparatus according to the second embodiment.

Next, an operation of the noise reduction apparatus 2 according to the second embodiment will be described. First, FIG. 11 shows a diagram describing processing for suppressing a sudden sound, in which the noise reduction apparatus 2 according to the second embodiment is especially effective. As shown in FIG. 11, the noise reduction apparatus 2 according to the second embodiment efficiently suppresses the sudden sound which exists across frames. In order to describe the processing, FIG. 12 is a flowchart showing an operation of the noise reduction apparatus according to the second embodiment. Like in the first embodiment, in the second embodiment, the processing shown in FIG. 12 is executed each time the frame to be analyzed is input. Further, in this flowchart, in order to clarify the description of the suppression processing method by two-frame processing, processing of the voice determination unit corresponding to FIG. 9 is omitted. When a voice is mixed, the processing which is similar to that shown by the flowchart in FIG. 2 may be added to FIG. 12.

As shown in FIG. 12, the noise reduction apparatus 2 according to the second embodiment first acquires the input signal Ain (Step S20). The noise reduction apparatus 2 then frames the input signal Ain by the frame configuration unit 11 to generate the input signal Din (Step S21). In Step S21, the input signal Din having the length of two frames is generated.

The noise reduction apparatus 2 then determines whether the suppression process completion flag of the addition controller 21 is valid or invalid (Step S22). When it is determined in Step S22 that the suppression process completion flag is valid (N in Step S22), the storage data of the second-half frame of the frame to be analyzed processed in the last processing stored in the addition controller 22 (corresponding to the first-half frame in the current frame to be analyzed) is output (Step S26). After Step S26, the suppression process completion flag is made invalid (Step S27) since there is no frame which has been subjected to suppression processing.

Meanwhile, when it is determined in Step S22 that the suppression process completion flag is invalid (Y in Step S22), sudden sound detection processing is executed (Step S23). In the processing in Step S23, a sudden sound is detected for the whole frame to be analyzed. When it is determined in Step S23 that the first-half frame does not include a sudden sound (N in Step S24), the previous input signal corresponding to the first-half frame of the current frame to be analyzed is output (Step S28). After Step S28, the suppression process completion flag of the addition controller 21 is made invalid (Step S29) since the sudden sound suppression processing for the second-half frame (current input signal) of the frame to be processed has not been completed.

When it is determined in Step S23 that the first-half frame includes a sudden sound (Y in Step S24), the sudden sound position determination unit 20 determines whether the sudden sound exists across two frames included in the current frame to be analyzed (Step S25). In Step S25, it is determined whether the sudden sound exists across the two frames from the peak position of the sudden sound that is detected, rising and falling sections that are sections before and after the section of forming the sudden sound, and a frame length which is a unit of framing.

When it is determined in Step S25 that the sudden sound exists across frames (Y in Step S25), inter-frame sudden sound suppression processing is executed (Step S30). Meanwhile, when it is determined in Step S25 that there is no sudden sound that exists across frames (N in Step S25), first-half frame sudden sound suppression processing is performed on the first-half frame (previous input signal) of the frame to be analyzed (Step S31).

Figure 13:
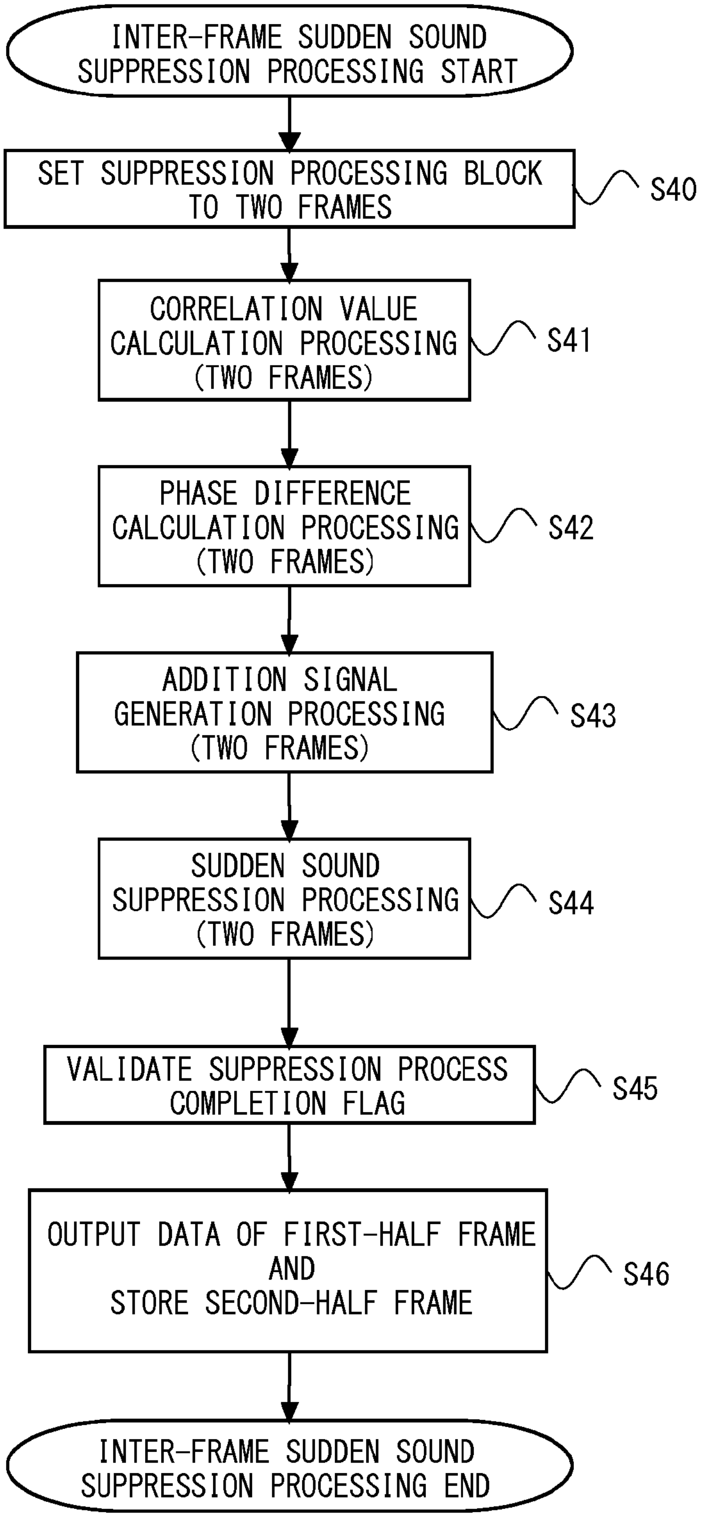
FIG. 13 is a flowchart showing an operation of inter-frame sudden sound suppression processing in the noise reduction apparatus according to the second embodiment.

Now, the inter-frame sudden sound processing in Step S30 will be described in more detail. FIG. 13 is a flowchart showing an operation of the inter-frame sudden sound suppression processing in the noise reduction apparatus according to the second embodiment.

As shown in FIG. 13, when starting the inter-frame sudden sound suppression processing, the noise reduction apparatus 2 first sets a suppression target processing block of the correlation value calculation unit 16 to two frames by the sudden sound position determination unit 20 (Step S40). Subsequently, using two frames as one frame to be processed, correlation value calculation processing (Step S41), phase difference calculation processing (Step S42), addition signal generation processing (Step S43), and sudden sound suppression processing (Step S44) are executed as the processing corresponding to Steps S6-S9 in FIG. 2.

Subsequently, in the inter-frame sudden sound suppression processing, the sudden sound suppression processing is completed also for the second-half frame (current input signal) of the frame to be processed. The suppression process completion flag of the addition controller 21 is then made valid (Step S45). The noise reduction apparatus 2 then outputs the first-half frame (previous input signal) of the frame to be processed as the output signal So and stores the second-half frame (Step S46).

Figure 14:
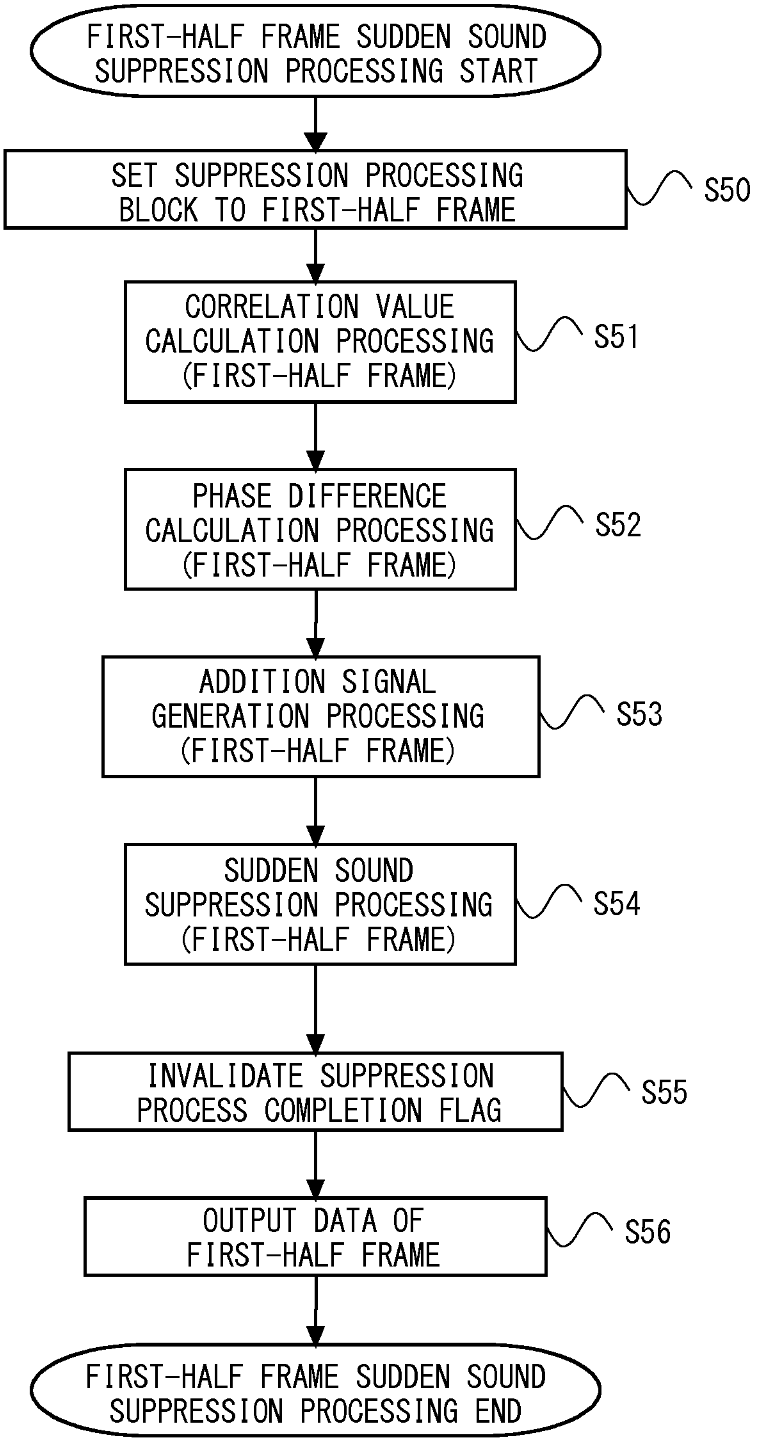
FIG. 14 is a flowchart showing an operation of first-half frame sudden sound suppression processing in the noise reduction apparatus according to the second embodiment.

Next, the first-half frame sudden sound processing in Step S31 will be described in more detail. FIG. 14 is a flowchart showing an operation of the first-half frame sudden sound suppression processing in the noise reduction apparatus according to the second embodiment.

As shown in FIG. 14, when starting the first-half frame sudden sound suppression processing, the noise reduction apparatus 2 first sets the suppression target processing block of the correlation value calculation unit 16 to the first-half frame by the sudden sound position determination unit 20 (Step S50). Subsequently, using the first-half frame as one frame to be processed, correlation value calculation processing (Step S51), phase difference calculation processing (Step S52), addition signal generation processing (Step S53), and sudden sound suppression processing (Step S54) corresponding to the processing of Steps S6-S9 in FIG. 2 are executed.

Subsequently, in the first-half frame sudden sound suppression processing, the sudden sound suppression processing has not been completed for the second-half frame (current input signal) of the frame to be processed. The suppression process completion flag of the addition controller 21 is then made invalid (Step S55). The noise reduction apparatus 2 then outputs the first-half frame (previous input signal) of the frame to be processed as the output signal So (Step S56).

In order to take into account the influences of voice components, when the voice determination unit is added, the voice section determination processing is executed by the input signal which coincides with a frame length to be processed. More specifically, in the inter-frame sudden sound suppression processing shown in FIG. 13, voice section determination for the first-half frame and the second-half frame is performed. Further, in the case of the first-half frame sudden sound suppression processing shown in FIG. 14, the voice section determination for the first-half frame is executed. As a result, it is possible to adequately select and update the sudden sound information to be used based on the presence or absence of voice components in the frame to be analyzed.

From the above description, it is seen that in the noise reduction apparatus 2 according to the second embodiment, even when a sudden sound exists across frames, temporally successive two frames are processed, thereby suppressing the sudden sound.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A noise reduction apparatus comprising:

a sensor configured to capture an input signal containing voice components; and a processor, wherein the processor performs processes comprising:

extracting a signal in a section including a sudden sound from of the input signal that is input by the sensor before a current input signal is input, the sudden sound being a hitting sound having periodicity and having a signal level of voice components equal to or smaller than a predetermined threshold;

storing a waveform of the extracted signal as sudden sound information in a storage;

calculating a correlation value between the sudden sound information and the current input signal;

calculating a phase difference between the sudden sound information and a sudden sound in the current input signal based on a maximum value of the correlation value;

shifting a phase of the sudden sound information based on the phase difference and inverting a signal waveform of the sudden sound information to generate an addition signal; and adding the addition signal and the current input signal and thereby generating a signal in which the sudden sound in the current input signal is suppressed.

2. The noise reduction apparatus according to claim 1, wherein the processor further performs processes comprising:

detecting that a sudden sound to be suppressed is included in the current input signal;

determining whether a voice, which is not subject to suppression, is included in the current input signal; and updating the sudden sound information with the current input signal when it is determined that the voice is not included in the current input signal and the sudden sound is detected.

3. The noise reduction apparatus according to claim 1, wherein the processor further performs processes comprising:

determining whether the sudden sound is located across the current input signal and a previous input signal that is input in a process cycle just before a process cycle of inputting the current input signal, generating the addition signal using the current input signal and the previous input signal as one input signal when it is detected that the sudden sound is located across the current input signal and the previous input signal, and executing, when it is detected that the sudden sound is located across the current input signal and the previous input signal, on the previous input signal and the current input signal processing for suppressing the sudden sound to which the addition signal is applied to output the output signal corresponding to the previous input signal, and a suppression process completion flag indicating that suppression processing that has been carried out for the current input signal is made valid.

4. The noise reduction apparatus according to claim 3, wherein the processor further performs processes comprising:

detecting that a sudden sound to be suppressed is included in the current input signal;

determining whether a voice, which is not subject to suppression, is included in the current input signal; and updating the sudden sound information when it is determined that the voice is not included in the current input signal and the sudden sound is detected updating, when it is determined that the sudden sound exists across the current input signal and the previous input signal and it is determined that the voice is not included in either of the current input signal and the previous input signal, the sudden sound information with the current input signal and the previous input signal, and updating, when it is determined that the sudden sound exists in the previous input signal without being arranged across the current input signal and the previous input signal, the sudden sound information with the previous input signal.

5. The noise reduction apparatus according to claim 1, wherein:

the current input signal is data obtained by framing a voice signal obtained by the sensor in a predetermined cycle, and the noise reduction apparatus performs processing for suppressing the sudden sound for each frame that is input.

6. A noise reduction method in a noise reduction apparatus that suppresses a sudden sound included in an input signal to output an output signal, the method comprising:

extracting a signal in a section including a sudden sound from an input signal containing voice components that is input by a sensor before a current input signal is input, the sudden sound being a hitting sound having periodicity and having a signal level of voice components equal to or smaller than a predetermined threshold;

storing a waveform of the extracted signal as sudden sound information in a storage;

calculating a correlation value between the sudden sound information and the current input signal;

calculating a phase difference between the sudden sound information and a sudden sound in the current input signal based on a maximum value of the correlation value;

shifting a phase of the sudden sound information based on the phase difference and inverting a signal waveform of the sudden sound information to generate an addition signal; and adding the addition signal and the current input signal and thereby generating a signal in which the sudden sound in the current input signal is suppressed.

7. A non-transitory computer readable medium storing instructions for noise reduction executed in an operation unit in a noise reduction apparatus that comprises the operation unit and a storage unit, and suppresses a sudden sound included in an input signal to output an output signal, the instructions for noise reduction comprising:

sudden sound information storing processing that extracts a signal a in a section including a sudden sound from an input signal containing voice components that is input by a sensor before a current input signal is input, the sudden sound being a hitting sound having periodicity and having a signal level of voice components equal to or smaller than a predetermined threshold, and stores a waveform of the extracted signal as sudden sound information;

correlation value calculation processing that calculates a correlation value between the sudden sound information and the current input signal;

phase difference calculation processing that calculates a phase difference between the sudden sound information and a sudden sound in the current input signal based on a maximum value of the correlation value;

addition signal generation processing that shifts a phase of the sudden sound information based on the phase difference and inverts a signal waveform of the sudden sound information to generate an addition signal; and sudden sound suppression processing that adds the addition signal and the current input signal and thereby generating a signal in which the sudden sound in the current input signal is suppressed.

* * * * *